US009538416B2

(12) United States Patent
Van Phan et al.

(10) Patent No.: US 9,538,416 B2
(45) Date of Patent: Jan. 3, 2017

(54) HANDLING RADIO LINK FAILURE (75) Inventors: Vinh Van Phan, Oulu (FI); Ling Yu, Espoo (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/422,795

(22) PCT Filed: Aug. 22, 2012

(86) PCT No.: PCT/EP2012/066342
§ 371 (c)(1),
(2), (4) Date: Feb. 20, 2015

(87) PCT Pub. No.: WO2014/029429
PCT Pub. Date: Feb. 27, 2014

(65) Prior Publication Data
US 2015/0223106 A1    Aug. 6, 2015

(51) Int. Cl.
*H04W 28/02* (2009.01)
*H04L 29/14* (2006.01)
(Continued)

(52) U.S. Cl.
CPC .......... *H04W 28/0247* (2013.01); *H04L 29/14* (2013.01); *H04W 36/0061* (2013.01);
(Continued)

(58) Field of Classification Search
CPC ............... H04L 29/14; H04W 28/0247; H04W 36/0061; H04W 72/0426; H04W 72/027; H04W 72/028; H04W 84/045; H04W 84/047
See application file for complete search history.

(56) References Cited

U.S. PATENT DOCUMENTS 6,298,060 B1 *  10/2001  Miyakawa ............. H04L 29/06
                                                           370/328
8,724,479 B1 *   5/2014  Aybay ................. H04L 49/1515
                                                           370/242
(Continued)

FOREIGN PATENT DOCUMENTS

WO   WO 2011/022613 A1   2/2011
WO   WO 2011/118997 A2   9/2011
WO   WO 2014/000808 A1   6/2012

OTHER PUBLICATIONS

3GPP TS 36.300 V11.2.0 (Jun. 2012), "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 201 pgs.

*Primary Examiner* — Dung B Huynh
(74) *Attorney, Agent, or Firm* — Harrington & Smith (57) ABSTRACT

This document discloses transmission of a radio link failure control message in a situation where a control plane connection is established directly between a first access point of a cellular communication system and a terminal device of the cellular communication system and, additionally, a user plane connection is established between the first access point and the terminal device through a second access point. The radio link failure control message is transferred over the user plane connection during the radio link failure or proactively in an attempt to prevent the radio link failure.

31 Claims, 4 Drawing Sheets

(51) Int. Cl.
*H04W 36/00* (2009.01)
*H04W 72/04* (2009.01)
*H04W 76/02* (2009.01)

(52) U.S. Cl.
CPC ..... *H04W 72/0426* (2013.01); *H04W 76/028* (2013.01); *H04W 76/027* (2013.01)

(56) References Cited

U.S. PATENT DOCUMENTS

| | | | | |
|---|---|---|---|---|
| 2008/0242292 A1* | 10/2008 | Koskela | .............. | H04W 76/028 455/423 |
| 2008/0268850 A1* | 10/2008 | Narasimha | ........ | H04W 36/0072 455/437 |
| 2010/0111032 A1* | 5/2010 | Wu | ................... | H04W 74/0833 370/331 |
| 2011/0039552 A1* | 2/2011 | Narasimha | .......... | H04W 76/028 455/425 |
| 2011/0122854 A1* | 5/2011 | De Lind Van Wijngaarden | ....... | H04L 12/5692 370/338 |
| 2011/0170422 A1* | 7/2011 | Hu | .................... | H04W 36/0055 370/242 |
| 2011/0199919 A1* | 8/2011 | Lin | ........................ | H04B 7/155 370/252 |
| 2011/0242969 A1* | 10/2011 | Dayal | ............... | H04W 36/0055 370/225 |
| 2011/0250892 A1* | 10/2011 | Gupta | ............... | H04W 36/0011 455/437 |
| 2011/0317552 A1* | 12/2011 | Lee | .................... | H04L 27/2601 370/228 |
| 2012/0088498 A1* | 4/2012 | Xiao | ..................... | H04W 24/02 455/424 |
| 2012/0142336 A1* | 6/2012 | Van Phan | ......... | H04W 36/0033 455/423 |
| 2012/0176955 A1* | 7/2012 | Ishii | .................... | H04W 72/042 370/315 |
| 2012/0281566 A1* | 11/2012 | Pelletier | .............. | H04W 76/046 370/252 |
| 2012/0314689 A1* | 12/2012 | Wang | .................... | H04W 36/12 370/331 |
| 2013/0122892 A1* | 5/2013 | Morioka | ................ | H04B 7/155 455/422.1 |
| 2013/0165130 A1* | 6/2013 | Wu | ....................... | H04W 36/08 455/444 |
| 2013/0176953 A1* | 7/2013 | Stern-Berkowitz | . | H04W 52/146 370/329 |
| 2013/0252613 A1* | 9/2013 | Charbit | ................ | H04W 36/30 455/437 |
| 2013/0267223 A1* | 10/2013 | Tajima | ............... | H04W 76/028 455/423 |
| 2013/0295939 A1* | 11/2013 | Wegmann | ........... | H04W 76/028 455/436 |
| 2014/0004863 A1* | 1/2014 | Zhang | ................ | H04W 36/0033 455/444 |
| 2014/0092866 A1* | 4/2014 | Teyeb | ................. | H04W 76/045 370/331 |
| 2014/0128092 A1* | 5/2014 | Xiong | ................... | H04W 24/02 455/454 |
| 2014/0153390 A1* | 6/2014 | Ishii | .................... | H04W 76/023 370/230 |
| 2014/0342738 A1* | 11/2014 | Ishii | .................... | H04W 28/08 455/436 |
| 2014/0349694 A1* | 11/2014 | Raghothaman | ....... | H04W 36/00 455/509 |
| 2015/0078323 A1* | 3/2015 | Song | ..................... | H04W 28/18 370/329 |
| 2015/0109901 A1* | 4/2015 | Tan | ....................... | H04W 24/04 370/218 |
| 2015/0133128 A1* | 5/2015 | Xiong | ................... | H04W 36/22 455/444 |
| 2016/0044651 A1* | 2/2016 | Lu | ....................... | H04W 72/0406 370/329 |

\* cited by examiner

HANDLING RADIO LINK FAILURE

FIELD

The invention relates to the field of wireless communications and, particularly, to handling radio link failures in wireless networks.

BACKGROUND

In a cellular radio network, a radio link failure may occur when a terminal device in a connected state loses a control channel connection with a serving base station because of a poor-quality radio link, for example. This may result in that the terminal device has to reconnect to the cellular radio network via an idle state.

BRIEF DESCRIPTION

The invention is defined by the independent claims.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. The same reference numbers in different Figures represent the same or similar functionalities or structures.

Figure 1:
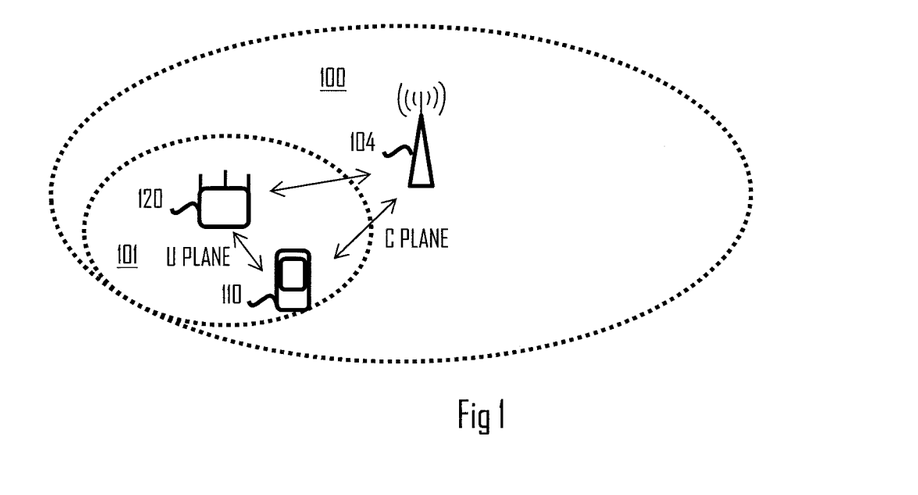
FIG. 1 illustrates communication between a terminal device and a cellular communication system.

FIG. 1 illustrates a wireless communication scenario to which embodiments of the invention may be applied. FIG. 1 illustrates an example of an offloaded communication scenario in which a terminal device 110 is connected to a first access point 104 a cellular communication system. The first access point 104 is arranged to provide wireless access within its coverage area comprising one or more cells 100. The terminal device 110 is further connected to a second access point 120 providing wireless access within its coverage area 101. In the offloaded communication scenario illustrated in FIG. 1, the connection between the first access point 104 and the terminal device 110 is a control plane connection. The control plane connection may be defined as a connection for transferring control information or signalling information needed to manage the connectivity of the terminal device with the cellular communication system. The connection between the second access point 120 and the terminal device 110 is a user plane connection. The user plane connection may be defined as a connection for transferring payload data related to the terminal device 110, e.g. uplink data and/or downlink data. The user plane is also called "a bearer plane" and "a data plane" in the literature. The second access point 120 may relay the data between the first access point 104 and the terminal device, and the control plane may be used to maintain the user's context in the cellular communication system, e.g. in the first access point 104 in order to transmit/receive the data over the user plane.

Figure 2A:
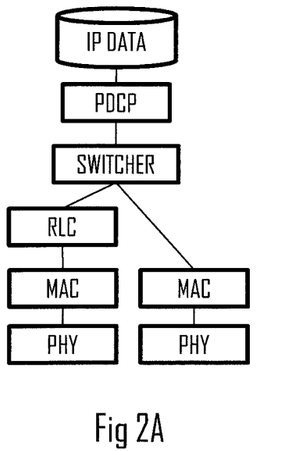
FIGS. 2A to 2C illustrate examples of how to realize switching of a user plane connection.
Figure 2B:
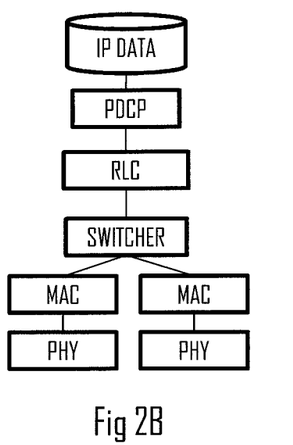
Figure 2C:
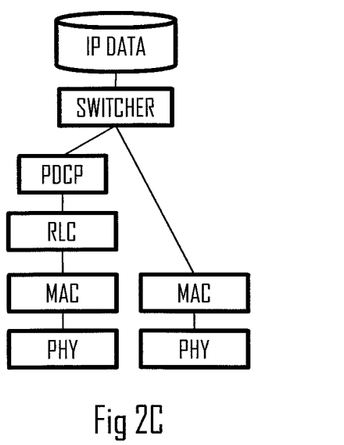

The offloading may refer to the split control plane and user plane routed between the first access point 104 and the terminal device 110 through different paths, e.g. the control plane via a direct path and the user plane via an indirect path through the second access point 120. The user plane may be switched between the indirect path and the direct path adaptively, e.g. according to traffic load in the first access point 104. It may be assumed that a link between the first access point 104 and the second access point provides a higher capacity than a link between the terminal device 110 and the first access point 104 and, therefore, the offloading may reduce the load in the first access point. The link between the first access point 104 and the second access point 120 may be a wired or a wireless link. FIGS. 2A to 2C illustrate examples for realizing the user plane switching between the cellular radio connection through the first access point 104 and the indirect path via the second access point. In the examples of FIGS. 2A to 2C, it is assumed that the second access point 120 operates according to a different radio access technology than the first access point 104, thereby having different protocol layers. The examples of FIGS. 2A to 2C may be used when the second access point 120 is an access point of an IEEE 802.11 (Wi-Fi) network or a corresponding network providing only medium access control layer (MAC) and physical layer (PHY) services. However, it should be appreciated that the examples shown may be easily adapted to different embodiments of the second access point 120, e.g. the second access point 120 being an access point of the cellular communication system and the offloading being realized as a part of carrier aggregation (CA) functionality known from specifications of a Universal Mobile Telecommunication System Long-Term Evolution Advanced (UMTS LTE-A), for example. The carrier aggregation allows expansion of an effective bandwidth delivered to the terminal devices through concurrent utilization of radio resources across multiple carriers. Multiple component carriers are aggregated to form a larger overall transmission bandwidth. In the embodiment of FIG. 1, the first access point 104 may operate a first component carrier called a primary cell (PCell), while the first access point 104 may allocate a second component carrier (a secondary cell, SCell) to the second access point 120 operating within the coverage area 100 of the first access point 100.

The cellular communication system may be any cellular system employing the above-described offloading, e.g. the LTE-A. The second access point may utilize the same radio access technology as the cellular system or it may be any other radio system capable of providing a wired or wireless backhaul link to the cellular system, e.g. the Wi-Fi.

The system of FIG. 1 may employ the following system scenario without being limited to this type of operation. Wi-Fi access points are deployed underneath a macro cell coverage of the cellular communication system and connected to, coordinated and controlled by the serving macro cell access point (a base station or an evolved Node B) and the cellular communication system, forming a radio access layer integrated to the serving macro cell for the user plane. This is referred to as the integrated radio access offloading layer. The control plane is provided by the serving macro cell access point. A bearer service model of the cellular communication system may be employed but actual data transmissions in the user plane radio bearer(s) may be transferred via according to the Wi-Fi technology. This means that possible offloading is managed on a radio access layer and all bearers of the terminal device are still terminated at the serving macro cell access point. It is a matter of configuration whether only best effort traffic and corresponding radio bearer(s) or any user plane traffic and corresponding radio bearer(s) are offloaded to the Wi-Fi. The transmission of an individual radio bearer may be switched in time instead of splitting it between the cellular system and the Wi-Fi for possible offloading. The user plane cellular security may be applied, e.g. service data units sent/offloaded over the Wi-Fi are at least below a layer handling ciphering and security processing in the cellular system. Link layer data processing including packet segmentation or concatenation may be omitted when offloading over the Wi-Fi for simplicity. The terminal device may be allowed to make offloading decisions by itself as much as possible so as to minimize control overhead in the serving cellular network. This method may therefore be called network assisted semi-autonomous offloading.

Referring to FIG. 2A, the switching (see "switcher" in FIG. 2A) of the user plane between the direct path and the indirect path may be realized between a packet data convergence protocol layer (PDCP) and a radio link control layer (RLC). The PDCP may perform header (de)compression for internet protocol (IP) data, manage radio bearers of terminal devices, manage cellular security features, etc., while the RLC handles flow control and error recovery including retransmissions. In this embodiment, when the user plane is switched through the second access point 120, the PDCP layer of the first access point 104 transfers data packets with a MAC layer of the second access point. In the example of FIG. 2B, the switching is realized between the RLC and the MAC layers. In this embodiment, when the user plane is switched through the second access point 120, the RLC layer of the first access point 104 transfers data packets with the MAC layer of the second access point 120. This embodiment enables the retransmissions and the flow control of the RLC to be realized also for the user plane through the second access point 120. In the example of FIG. 2C, the switching is realized above the PDCP layer. In this embodiment, when the user plane is switched through the second access point 120, at least some of the features of the PDCP, e.g. the security features, may be carried out above the PDCP layer or a separate PDCP layer may be provided for the offloaded situations.

Figure 3:
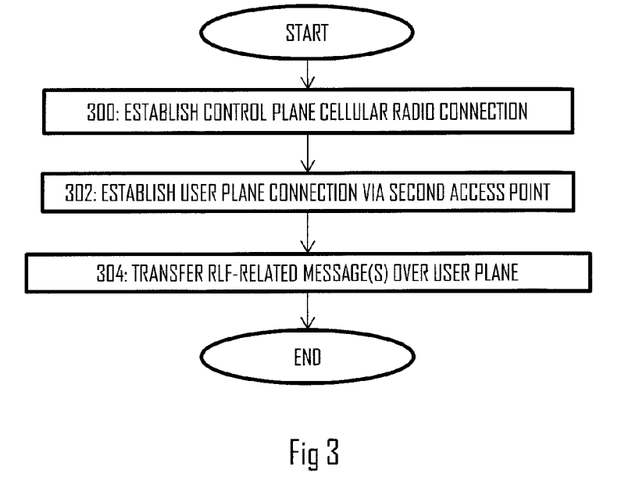
FIG. 3 illustrates a procedure related to a radio link failure in the context described in FIGS. 1 and 2A to 2C.

FIG. 3 illustrates an embodiment relating to handling radio link failures when the control plane and the user plane are routed between the terminal device 110 and the first access point 104, e.g. a macro cell base station, through different paths. Because of the fact that the terminal device has a control plane cellular radio connection with the first access point 104 and the user plane connection with the second access point 120, the radio environments of the control plane connection and the user plane connection are different. Therefore, the control plane connection may experience a radio link failure while the user plane connection experiences no problems. Because of the degraded control plane connection, the terminal device may have to go to idle state although it would be able to transfer data through the user plane with no problems.

Referring to FIG. 3, the terminal device 110 establishes a control plane cellular radio connection with the first access point 104 of the cellular radio network (block 300). In block 302, the terminal device establishes a user plane connection with the first access point 104 via the second access point 120 by using a different radio link. The second access point 120 may route the user plane connection between the terminal device and the first access point 104. In block 304, at least one control message related to a radio link failure (RLF) of the control plane connection is transferred between the first access point 104 and the terminal device 110 over the user plane connection via the second access point 120.

The transfer of the RLF-related control messages over the user plane may enable fast recovery from the radio link failure in the control plane connection, prevent loss of the user plane connection as well, and/or prevent the control plane RLF proactively, as will be described in the embodiments below.

Figure 4:
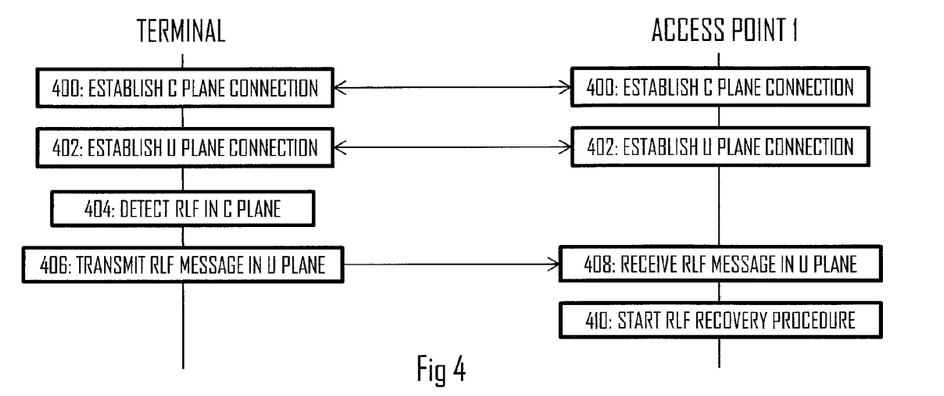
FIG. 4 illustrates a signalling diagram of communicating between an access point of a cellular communication system and a terminal device during the radio link failure according to an embodiment of the invention.
Figure 6:
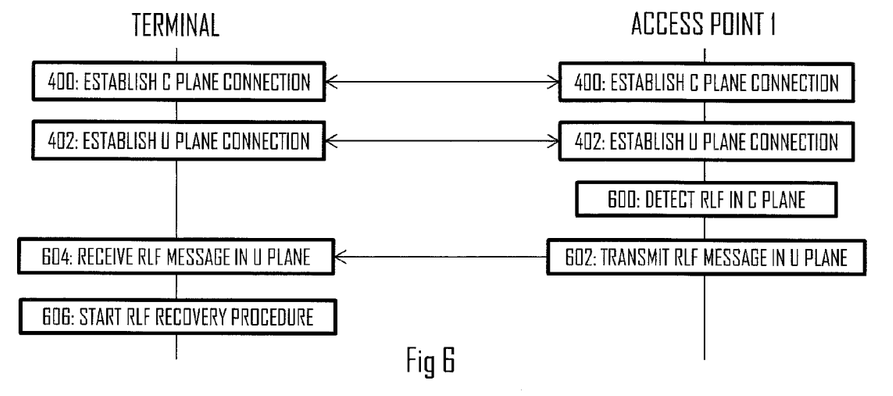
FIG. 6 illustrates another signalling diagram of communicating between the access point and the terminal device during the radio link failure according to an embodiment of the invention.
Figure 7:
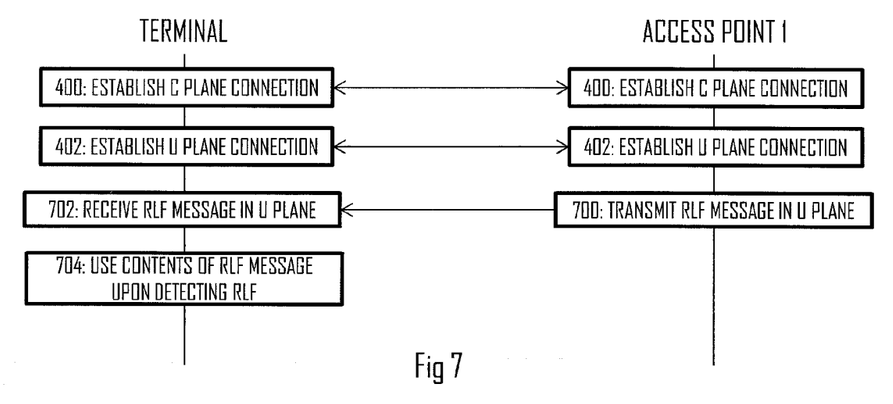
FIG. 7 illustrates signalling between the terminal device and the first access point in an attempt to prevent the radio link failure or to enable fast recovery from the radio link failure according to an embodiment of the invention.

The general concept of the process of FIG. 3 may be realized in the terminal device 110 or in the first access point 104. FIGS. 4, 6, and 7 illustrate different embodiments of carrying out the process of FIG. 3 in the terminal device 110 and in the first access point 104. FIG. 4 illustrates an embodiment in which the terminal device detects the radio link failure in the control plane connection. Referring to FIG. 4, the terminal device and the first access point establish the direct control plane connection in block 400 and the indirect user plane connection via the second access point in block 402.

In the operation of this split plane connectivity, the terminal device detects in block 404 the radio link failure in the control plane connection. The radio link failure may be detected by not detecting any transmissions from the first access point in the control plane, e.g. no acknowledgments to uplink control messages, no downlink control messages within a determined time interval etc.

Upon detecting the radio link failure in the control plane connection, the terminal device transmits a radio link failure notification message in the user plane to the first access point in block 406. In an embodiment, the radio link failure notification message is an empty protocol data unit or another packet that implicitly indicates the presence of the radio link failure. In another embodiment, the radio link failure notification message is a control (type of) protocol data unit (C-PDU), e.g. a PDCP C-PDU, RLC C-PDU or a MAC C-PDU, having at least one information element explicitly indicating the presence of the radio link failure. The first access point receives the radio link failure notification message through the second access point in block 408 and determines from the contents of the radio link failure notification message that the control plane experiences a radio link failure. Upon determining the presence of the radio link failure in the control plane, the first access point initiates a radio link recovery procedure.

In an embodiment, block 410 comprises transmitting a radio link recovery message from the first access point to the terminal device over the user plane. The radio link recovery message may comprise control information enabling the terminal device to recover from the radio link failure or to operate during the radio link failure. The control information may comprise timing advance information indicating an adjustment value for uplink transmission timing of the control plane connection. The control information may comprise a random access preamble allocation for the terminal device to use for reestablishment of the uplink synchronization.

Figure 5:
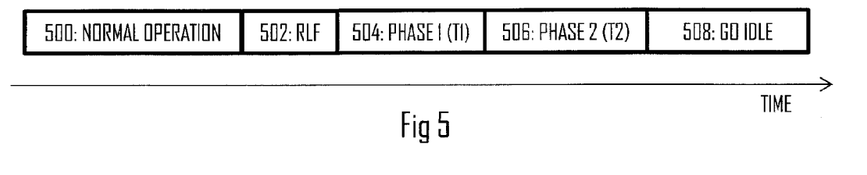
FIG. 5 illustrates timers related to recovery from the radio link failure.

In an embodiment, block 410 comprises extending duration of a timer counting a time period allowed for recovery from the radio link failure before switching the terminal device to an idle mode. For example, the LTE-A uses a two-phase RLF recovery procedure, wherein a timer is used to count the duration of each phase. FIG. 5 illustrates such a procedure. Referring to FIG. 5, upon occurrence of the radio link failure (502) during normal operation (500) of the control plane connection, the terminal device and the first access point monitor the channel quality (physical layer) and random access attempts (MAC layer) during the first phase 504. A radio resource control layer is also notified of the problems in the channel quality and the random access attempts. The duration of the first phase is counted by a first timer. Upon expiry of the first timer, the first phase 504 ends and a second phase begins. During the second phase, the radio link recovery is attempted actively through a radio resource control (RRC) connection reestablishment procedure, for example. The reestablishment may be carried out in any cell storing the context of the terminal device. Table 1 below shows the functionality of the RRC connection reestablishment. The terminal device is abbreviated by UE.

TABLE 1

| Operation | 1$^{st}$ Phase | 2$^{nd}$ Phase | 2$^{nd}$ Timer exp. |
|---|---|---|---|
| UE returns to same cell | Resume normal operation | RRC reestablishment | Reestablishment via idle state |
| UE selects a different cell of 1$^{st}$ access point | N/A | RRC reestablishment | Reestablishment via idle state |
| UE selects a cell storing UE context | N/A | RRC reestablishment | Reestablishment via idle state |
| UE selects a cell not storing UE context | N/A | Reestablishment via idle state | Reestablishment via idle state |

In the second phase 506 in an attempt to resume activity and avoid the reestablishment via the idle state, the terminal device may use the following procedure: the terminal device stays in the RRC Connected state, the terminal device accesses the cell through the random access procedure by using the random access preamble and/or timing advance received through the user plane connection, for example; the identifier of the terminal device used in the random access procedure for contention resolution, e.g. a cellular radio network temporary identifier (C-RNTI) of the terminal device in the cell where the RLF occurred, and a physical layer identity of that cell, and short MAC Identifier based on the keys of that cell are used by the selected access point to authenticate the terminal device and check whether it has a context stored for that terminal device; if the access point finds a context that matches the identity of the terminal device, it indicates to the terminal device that the control plane connection may be resumed; if the context is not found, the control plane connection is released and the terminal device initiates procedure to establish a new control plane connection. In this case, the terminal device may first enter a RRC_IDLE state (508).

Referring to FIGS. 4 and 5, block 410 may comprise extending and/or resetting at least once at least one of the first timer and the second timer. Block 410 may also comprise transmitting a notification of the extension and/or resetting of the timer(s) to the terminal device over the user plane connection. Upon receiving such a notification, the terminal device may also extend and/or reset its corresponding timer(s).

In an embodiment, the data transfer over the user plane connection is continued regardless of the radio link failure in the control plane connection.

In an embodiment, the terminal device may repeat block 406 periodically during the radio link failure. The periodicity may be a time-based periodicity or a function of transmitted data packets. An example of the time-based periodicity is that the terminal device transmits the radio link failure notification message after expiry of a determined (fixed) time interval from the previous transmission of the radio link failure notification message. An example of the data packet number based periodicity is that the terminal device transmits the radio link failure notification message after every N$^{th}$ transmitted data packet.

FIG. 6 illustrates an embodiment where the first access point detects the radio link failure in the control plane. Referring to FIG. 6, the control plane connection and the user plane connection are established in the above-described manner in blocks 400 and 402, respectively. In block 600, the first access point detects the radio link failure in the control plane connection, e.g. upon receiving no uplink signalling messages from the terminal device. Upon detecting the radio link failure in the control plane connection, the first access point transmits a radio link failure notification message in the user plane to the terminal device in block 602. In an embodiment, the radio link failure notification message is an empty protocol data unit or another packet that implicitly indicates the presence of the radio link failure. In another embodiment, the radio link failure notification message is a control (type of) protocol data unit (C-PDU), e.g. a PDCP C-PDU, RLC C-PDU or a MAC C-PDU, having at least one information element explicitly indicating the presence of the radio link failure. The terminal device receives the radio link failure notification message through the second access point in block 604 and determines from the contents of the radio link failure notification message that the control plane experiences a radio link failure. Upon determining the presence of the radio link failure in the control plane, the terminal device initiates a radio link recovery procedure in block 606.

The terminal device may receive a random access channel preamble allocation and/or timing advance information as contents of the radio link notification message, and it may use the contents of the radio link failure notification message in block 606, e.g. to maintain synchronization with the first access point. Block 606 may comprise extending and/or resetting at least once at least one of the first timer and the second timer in the terminal device. The radio link failure notification message may comprise a command to extend the at least one timer. As mentioned above in connection with FIG. 4, the first access point may repeat block 602 according to a determined repetition pattern. In embodiments using the repeated transmission of the radio link failure notification message and the extension of the duration of the radio link recovery attempt, e.g. through extension/reset of the at least one timer, the timer(s) may be extended/reset upon reception of each radio link notification message. As a consequence, the duration of the radio link recovery attempt (first phase or the second phase) may be extended arbitrarily. Data may be transferred over the user plane during the radio link failure.

FIG. 7 illustrates an embodiment where the first access point proactively attempts to prevent the radio link failure or to provide for a fast recovery in case the radio link failure occurs. This may be carried out by transmitting a control message over the user plane. The control message may comprise the timing advance information and/or the random access channel preamble allocation for use in case of a radio link failure. The control message is transmitted by the first access point in block 700 and received by the terminal device over the user plane in block 702. Upon detecting the radio link failure in the control plane, the terminal device may use the contents of the control message in recovery from the radio link failure in the above-described manner, e.g. by maintaining synchronization with the first access point and/or extending/resetting the at least one timer.

In an embodiment, the first access point determines the timing advance information to be transmitted in the control message in block 700 from timing advance information of at least one other terminal device having a direct control plane connection with the first access point and an indirect user plane connection with the first access point through the same second access point. As the second access point has typically smaller coverage area than the first access point, e.g. a femtocell base station or a Wi-Fi access point, it may be assumed that the terminal devices served by the second access point have substantially similar distance to the first access point and, thus may use the same timing advance in control plane uplink transmissions. The control message may be a PDCP C-PDU, RLC C-PDU or a MAC C-PDU, for example. Block 700 may be carried out as a part of a PDCP radio bearer context update or synchronization procedure. Such procedures may be utilized for keeping the PDCP context(s) synchronized to ensure lossless and in-order data packet transmissions.

Blocks 700 to 704 may be carried out in connection with a handover of the terminal device from one access point to another. In connection with the preparation for the handover, a source access point to which the control plane of the terminal device is currently connected may transmit the context of the terminal device (including the context of the current offloading mode) to a target access point to which the handover is being prepared. Block 700 may be carried out by the source access point or the target access point. The source access point may carry out block 700 when the handover is being prepared but the terminal device is still connected to the source access point or after the handover has been prepared. It should be noted that even though the source access point has already released the control plane, the source access point may still communicate with the terminal device over the user plane through the second access point.

The target access point may carry out block 700 after the handover has been realized. The target access point may determine the timing advance for the terminal device being handed over on the basis of the second access point and timing advance of other terminal devices served by the second access point, for example, and signal the timing advance information to the terminal device via the source access point, e.g. over X2 interface between the base stations in the LTE-A. The user plane of the terminal device may be extended to the connection between the source access point and the target access point in the preparation for the handover or even before that. The source access point may then forward the timing advance information to the terminal device via the user plane connection and/or via the control plane connection.

It should be noted that the embodiment of FIG. 7 is readily applicable to the embodiments described in connection with FIGS. 4 and 6.

Figure 8:
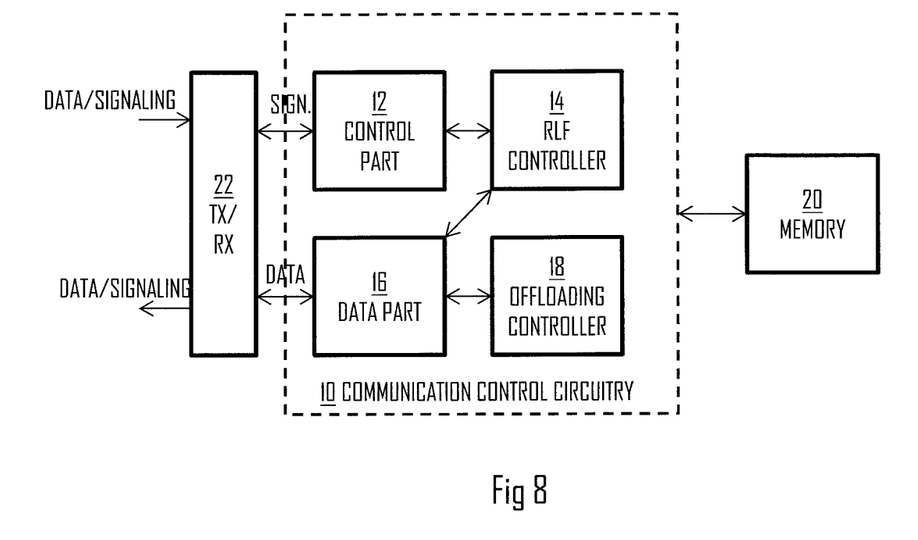
FIG. 8 is a block diagram illustrating a structure of an apparatus for managing radio link failures according to an embodiment of the invention.

FIG. 8 illustrates an embodiment of an apparatus comprising means for carrying out the above-mentioned functionalities during the radio link failure. The apparatus may be a wireless device which complies with specifications of a cellular communication network in order to operate the control plane. The wireless apparatus may also be a cognitive radio apparatus capable of adapting its operation to a changing radio environment, e.g. to changes in parameters of another system on the same frequency band. The wireless apparatus may be or may be comprised in a computer (PC), a laptop, a tablet computer, a cellular phone, a palm computer, a base station, or any other apparatus provided with radio communication capability. It should be appreciated that in one embodiment the apparatus may carry out the functionality of the terminal device and, in another embodiment, the apparatus may carry out the functionality of the first access point. In other embodiments, the apparatus is comprised in such a wireless device, e.g. the apparatus may comprise a circuitry, e.g. a chip, a processor, a micro controller, or a combination of such circuitries in the wireless device.

Referring to FIG. 7, the apparatus may comprise a communication controller circuitry 10 configured to control wireless communications in the wireless device. The communication controller circuitry 10 may comprise a control part 12 handling the control plane communication with respect to transmission, reception, and extraction of signalling information over the control plane connection. The communication controller circuitry 10 may further comprise a data part 16 that handles transmission and reception of payload data over the user plane connection. The communication control circuitry 10 may further comprise an offloading controller handling the switching of the user plane between the same cellular radio connection used for the control plane connection and another radio connection through another access point. Depending on the embodiment, the switching may be initiated by the first access point or the terminal device. The communication control circuitry 10 may further comprise a radio link failure controller 14 configured to transfer radio link failure related messages over the user plane, as described above. When the control part 12 detects a radio link failure in the control plane connection of an offloaded communication scenario, the control part 12 may indicate the radio link failure to the radio link failure controller 14, and the radio link failure controller 14 may control the data part 16 to transmit the above-mentioned radio link failure indication message over the user plane. The radio link failure controller may also handle the radio link failure recover procedure. In the embodiments where the apparatus is applicable to the access point and supports the embodiment of FIG. 7, the radio link failure controller 14 may cause the data part 16 to transmit the control messages usable for preventing the radio link failure and fast recovery from the radio link failure to the terminal device over the user plane.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise the memory 20 that stores computer programs (software) configuring the apparatus to perform the above-described functionalities of the wireless device, e.g. the terminal device or the first access point. The memory 20 may also store communication parameters and other information needed for the wireless communications. The apparatus may further comprise radio interface components 22 providing the apparatus with radio communication capabilities within the cellular communication system and, in some embodiments, with at least one other radio system, e.g. the Wi-Fi system. The radio interface components 22 may comprise standard well-known components such as an amplifier, filter, frequency-converter, (de)modulator, and encoder/decoder circuitries and one or more antennas. In the embodiments where the apparatus is the terminal device, the apparatus may further comprise a user interface enabling interaction with the user of the wireless device. The user interface may comprise a display, a keypad or a keyboard, a loudspeaker, etc.

In an embodiment, the apparatus carrying out the embodiments of the invention in the wireless device comprises at least one processor and at least one memory including a computer program code, wherein the at least one memory and the computer program code are configured, with the at least one processor, to cause the apparatus to carry out the functionalities of the terminal device or the first access point according to any one of the processes described above in connection with FIGS. 3 to 7. Accordingly, the at least one processor, the memory, and the computer program code form processing means for carrying out embodiments of the present invention in the terminal device and/or in the first access point.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods carried out by the first access point or the terminal device and described in FIGS. 3 to 7 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The protocols used, the specifications of mobile telecommunication systems, their network elements and terminal devices, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   exchanging, by a terminal device, control information with a macro cell access point of a cellular radio network over a control plane cellular radio connection;
   transferring, by the terminal device, data in a user plane over a user plane connection established between the terminal device and the macro cell access point via a second access point, the second access point being under control of the macro cell access point;
   detecting, by the terminal device, a radio link failure in the control plane cellular radio connection with the macro cell access point; and
   transferring, by the terminal device, at least one radio link recovery control message related to recovery from the detected radio link failure in the control plane cellular radio connection via the second access point over the user plane connection.

2. The method of claim 1, wherein the at least one radio link recovery control message comprises at least one uplink control message, and wherein said transferring further comprises: upon detecting the radio link failure, causing transmission of at least one uplink control message over the user plane connection.

3. The method of claim 1, said transferring further comprising:
   receiving at least one downlink control message related to the recovery from the radio link failure through the second access point over the user plane connection;
   detecting the radio link failure on the basis of the reception of the at least one downlink control message over the user plane connection.

4. The method of claim 3, further comprising upon receiving the at least one downlink control message over the user plane connection: extending a duration of a timer counting a time period allowed for recovery from the radio link failure before switching the terminal device to an idle mode.

5. The method of claim 3, further comprising receiving at least one of the following information elements in the at least one downlink control message over the user plane connection: a timing advance information to be used in uplink transmissions in the control plane cellular radio connection; and a random access channel preamble allocation.

6. The method of claim 1, further comprising continuing data transfer over the user plane connection during the radio link failure of the control plane cellular radio connection.

7. The method of claim 1, wherein the transferring at least one radio link recovery control message related to recovery from the detected radio link failure in the control plane cellular radio connection is carried out by using a packet data convergence protocol layer radio bearer context update or a synchronization procedure.

8. A method, comprising:
establishing, by a macro cell access point of a cellular radio network, a control plane cellular radio connection with a terminal device to exchange control information with the terminal device;
establishing a user plane connection with the terminal device via a second access point to transfer data with the terminal device, the second access point being under control of the macro cell access point; and
causing a transfer of at least one radio link recovery control message through the second access point over the user plane connection, wherein the radio link recovery control message indicates occurrence of the radio link failure in the control plane cellular radio connection or comprises information proactively preventing the occurrence of the radio link failure in the control plane cellular radio connection.

9. The method of claim 8, wherein said transfer of the at least one radio link recovery control message comprises:
receiving an uplink radio link recovery control message from the terminal device over the user plane connection; and
detecting the occurrence of the radio link failure in the control plane cellular radio connection on the basis of the received uplink radio link recovery control message.

10. The method of claim 9, further comprising upon receiving the at least one uplink radio link failure control message over the user plane connection: extending a duration of a timer counting a time period allowed for recovery from the radio link failure before releasing the control plane cellular radio connection.

11. The method of claim 8, further comprising upon detecting the radio link failure in the control plane cellular radio connection: causing transmission of a downlink radio link recovery control message over the user plane connection, wherein the downlink radio link recovery control message comprises at least one of the following information elements: a timing advance information to be used in uplink transmissions in the control plane cellular radio connection; and a random access channel preamble allocation.

12. The method of claim 8, wherein said causing transfer of at least one radio link recovery control message through the second access point over the user plane connection comprises: causing transmission of timing advance information to the terminal device over the user plane connection in connection with a handover of the terminal device.

13. The method of claim 12, wherein said causing transmission of the timing advance information to the terminal device over the user plane connection comprises transferring the timing advance information first over a user plane of the terminal device established between a source access point of the handover and a target access point of the handover, wherein the macro cell access point is one of the source access point and the target access point, and then transferring the timing advance information to the terminal device via the second access point.

14. The method of claim 8, further comprising: continuing data transfer over the user plane connection during the radio link failure of the control plane cellular radio connection.

15. An apparatus comprising:
at least one processor; and
at least one memory including a computer program code, wherein the at least one memory and the computer program code are configured, with the at least one processor, to cause the apparatus to:
exchange control information with a macro cell access point of a cellular radio network over a control plane cellular radio connection;
transfer data in a user plane over a user plane connection established between the terminal device and the macro cell access point via a second access point, the second access point being under control of the macro cell access point;
detect a radio link failure in the control plane cellular radio connection with the macro cell access point; and
transfer at least one radio link recovery control message related to recovery from the detected radio link failure in the control plane cellular radio connection via the second access point over the user plane connection.

16. The apparatus of claim 15, wherein, the at least one radio link recovery control message comprises at least one uplink message, and wherein the at least one memory and the computer program code are configured, with the at least one processor, to cause the apparatus cause, upon detecting the radio link failure, transmission of the at least one uplink message over the user plane connection.

17. The apparatus of claim 15, wherein the at least one memory and the computer program code are configured, with the at least one processor, to cause the apparatus to acquire at least one downlink control message related to the recovery from the radio link failure through the second access point over the user plane connection, and to detect the radio link failure on the basis of the reception of the at least one downlink control message over the user plane connection.

18. The apparatus of claim 17, wherein the at least one memory and the computer program code are configured, with the at least one processor, to cause the apparatus to extend, upon receiving the at least one downlink control message over the user plane connection, a duration of a timer counting a time period allowed for recovery from the radio link failure before switching the terminal device to an idle mode.

19. The apparatus of claim 17, wherein the at least one memory and the computer program code are configured, with the at least one processor, to cause the apparatus to acquire at least one of the following information elements in the at least one downlink control message over the user plane connection: a timing advance information to be used in uplink transmissions in the control plane cellular radio connection; and a random access channel preamble allocation.

20. The apparatus of claim 15, wherein the at least one radio link recovery control message comprises at least one of an empty protocol data unit and a dedicated control protocol data unit.

21. The apparatus of claim 20, wherein the dedicated control protocol data unit comprises at least one of the following: a packet data convergence protocol control protocol data unit; a radio link control protocol data unit and a medium access control protocol data unit.

22. The apparatus of claim 15, wherein the at least one memory and the computer program code are configured, with the at least one processor, to cause the apparatus to continue data transfer over the user plane connection during the radio link failure of the control plane cellular radio connection.

23. The apparatus of claim 15, further comprising radio interface components providing the apparatus with radio communication capability.

24. An apparatus comprising:
at least one processor; and
at least one memory including a computer program code, wherein the at least one memory and the computer program code are configured, with the at least one processor, to cause the apparatus to:
establish, with a macro cell access point of a cellular radio network, a control plane cellular radio connection with a terminal device to exchange control information with the terminal device;
establish a user plane connection with the terminal device via a second access point to transfer data with the terminal device, the second access point being under control of the macro cell access point; and
cause a transfer of at least one radio link recovery control message through the second access point over the user plane connection, wherein the radio link recovery control message indicates occurrence of the radio link failure in the control plane cellular radio connection or comprises information proactively preventing the occurrence of the radio link failure in the control plane cellular radio connection.

25. The apparatus of claim 24, wherein the at least one memory and the computer program code are configured, with the at least one processor, to cause the apparatus to
acquire uplink radio link recovery control message from the terminal device over the user plane connection; and
detect the occurrence of the radio link failure in the control plane cellular radio connection on the basis of the received uplink radio link recovery control message.

26. The apparatus of claim 25, wherein the at least one memory and the computer program code are configured, with the at least one processor, to cause the apparatus to extend, upon acquiring the at least one uplink radio link failure control message over the user plane connection, a duration of a timer counting a time period allowed for recovery from the radio link failure before releasing the control plane cellular radio connection.

27. The apparatus of claim 24, wherein the at least one memory and the computer program code are configured, with the at least one processor, to cause the apparatus to cause, upon detecting the radio link failure in the control plane cellular radio connection, transmission of a downlink radio link recovery control message over the user plane connection, wherein the downlink radio link recovery control message comprises at least one of the following information elements: a timing advance information to be used in uplink transmissions in the control plane cellular radio connection; and a random access channel preamble allocation.

28. The apparatus of claim 24, wherein the at least one memory and the computer program code are configured, with the at least one processor, to cause the apparatus to cause transmission of timing advance information to the terminal device over the user plane connection in connection with a handover of the terminal device.

29. The apparatus of claim 28, wherein the at least one memory and the computer program code are configured, with the at least one processor, to cause the apparatus to transfer the timing advance information first over a user plane of the terminal device established between a source access point of the handover and a target access point of the handover, wherein the apparatus is configured to operate as one of the source access point and the target access point, and then transfer the timing advance information to the terminal device via the second access point.

30. The apparatus of claim 24: wherein the at least one memory and the computer program code are configured, with the at least one processor, to cause the apparatus to continue data transfer over the user plane connection during the radio link failure of the control plane cellular radio connection.

31. The apparatus of claim 24, further comprising radio interface components providing the apparatus with radio communication capability.

* * * * *